United States Patent [19]

Weinraub

[11] 4,441,309
[45] Apr. 10, 1984

[54] ZERO TORQUE HELICALLY WRAPPED CABLE

[75] Inventor: William C. L. Weinraub, Durham, N.C.

[73] Assignee: Bell Telephone Laboratories, Incorporated, Murray Hill, N.J.

[21] Appl. No.: 526,386

[22] Filed: Aug. 25, 1983

Related U.S. Application Data

[63] Continuation of Ser. No. 284,499, Jul. 17, 1981, abandoned.

[51] Int. Cl.³ .............................................. D07B 1/06
[52] U.S. Cl. .................................................... 57/212
[58] Field of Search ................ 57/200, 210, 212–214, 57/216, 218, 220, 222, 225, 230, 231

[56] References Cited

U.S. PATENT DOCUMENTS

| | | | |
|---|---|---|---|
| 2,128,547 | 8/1938 | Wells | 57/212 X |
| 2,604,509 | 7/1952 | Blanchard | 57/214 X |
| 2,609,653 | 9/1952 | Peterson | 57/212 |
| 2,706,376 | 4/1955 | Kerr | 57/6 |
| 3,007,300 | 11/1961 | Peterson | 57/212 X |
| 3,455,100 | 7/1969 | Sides | 57/225 |
| 3,805,508 | 4/1974 | Maderna | 57/212 |
| 3,991,550 | 4/1974 | Cohen | 57/212 |
| 4,241,979 | 12/1980 | Gagen et al. | |

Primary Examiner—Donald Watkins
Attorney, Agent, or Firm—James H. Fox; Eugen E. Pacher

[57] ABSTRACT

A helical layer on a cable core produces a zero torque response when the lay angle is chosen according to the inventive method. Previously, two helical layers having opposite lay angles have been used to obtain a zero torque response. Lightguide cables having a metallic helical armor layer, for example, advantageously utilize the present technique, which reduces the tendency of the cable to kink.

9 Claims, 2 Drawing Figures

ZERO TORQUE HELICALLY WRAPPED CABLE

This is a continuation of application Ser. No. 284,499, filed July 17, 1981 now abandoned.

BACKGROUND OF THE INVENTION

1. Field of the Invention

This invention relates to cables having a helical element, including coaxial cables, multipair cables, or lightguide cables for telecommunications use.

2. Description of the Prior Art

Cables having one or more helical elements are used in a variety of applications, including telecommunications cables, such as coaxial cables, multipair cables, or lightguide cables. A helical wrap can serve as an armor member of such a cable when located near the outer portion of the cable. Other helical wrap elements include tapes, plastic ribbons, binders, etc. A helical wrap of a conductive material may also be used in the transmission of electrical power or electrical information.

Unless steps are taken to prevent it, a helical element typically introduces a torque response to a cable. That is, when an axial force is applied to the cable, causing it to elongate, there is a tendency of the cable to twist. Depending upon the construction of the cable, this twist may be either in the direction that causes the helical wrap to tighten, or in the direction that causes it to unwind. Such a torque response can in some cases cause a cable to kink when a cable is being unwound from a drum or otherwise handled, as for example during installation of the cable. Other handling difficulties can also result from a torque response. The tightening or unwinding of the helical element can also adversely affect the performance of the cable.

It is possible to counteract the torque response of one or more helical layers by providing for an opposite torque response in another helical layer. For example, one helical layer wound in one direction can be counteracted by an overlying helical layer wound in the opposite direction. Techniques for analyzing the torque response of helically wrapped cables have been developed which allow for predicting the lay angle of a counteracting helical element; see, for example, "Mechanical Characterization of Cables Containing Helically Wrapped Reinforcing Elements", by T. C. Cannon and M. R. Santana in the Proceedings of the 24th International Wire and Cable Symposium (1975), Cherry Hill, N.J.

SUMMARY OF THE INVENTION

I have discovered that a single helical wrap surrounding a cylindrical cable core can produce a zero torque response by the proper choice of the lay angle $\theta$ of the helical wrap. I have also determined a method for choosing the angle $\theta$ to produce a zero torque response, whereby the relative change of the radius of the core is compared to the relative change of the length of the core when axial stress is applied to the core. The lay angle is then chosen according to a specified formula. A metallic armor layer, for example, is advantageously applied according to this technique.

DETAILED DESCRIPTION

The following detailed description relates to helically wrapped cable whereby a zero torque response is produced in a single helical wrap. In the present cable design, a single helical wrap contributes zero torque to the cable core on which it is wound. Thus if the cable core has an essentially zero torque response prior to winding the helical element thereon, the resulting cable with the helical element also obtains an essentially zero torque response in the presence of an applied axial strain.

As shown in the above-noted paper by Cannon and Santana, the strain in a helical element ($\epsilon_s$) is related to the axial strain in the cable by the equation (1):

$$\epsilon_s = \epsilon_c(\cos^2\theta - N\sin^2\theta) - \phi(\pi R_s \sin 2\theta) \quad (1)$$

where $\epsilon_c$ is the axial strain in the cable, $\theta$ is the lay angle of the helical element (the angle formed by the longitudinal axis of the cable core and the axis of the helical element), $\phi$ is the cable twist in turns per unit length that results from the axial strain, $R_s$ is the radial location of the helical element, and N is the radial strain per unit of axial strain that the cable core experiences at the helical element due to the axial strain, and is given by equation (2):

$$N = \frac{-\Delta R_c/R_c}{\Delta L_c/L_c}, \quad (2)$$

where $R_c$ is the radius of the core on which the helical element is wrapped, and $L_c$ is the length of a segment of the core.

I have determined that a zero torque response can be obtained by solving equation (1) as follows: By imposing a zero twist end condition ($\phi=0$), equation (3) results:

$$\epsilon_s = \epsilon_c(\cos^2\theta - N\sin^2\theta) \quad (3)$$

Under the condition of zero torque, $\epsilon_s$, the strain in the helical element, becomes zero. This occurs when the lay angle $\theta$ is chosen according to the following equation:

$$\theta = \tan^{-1}[N^{-\frac{1}{2}}] \quad (4)$$

Therefore, by evaluating the values of ($\Delta R_c/R_c$) and ($\Delta L_c/L_c$), the lay angle yielding zero torque can be determined.

Figure 1:
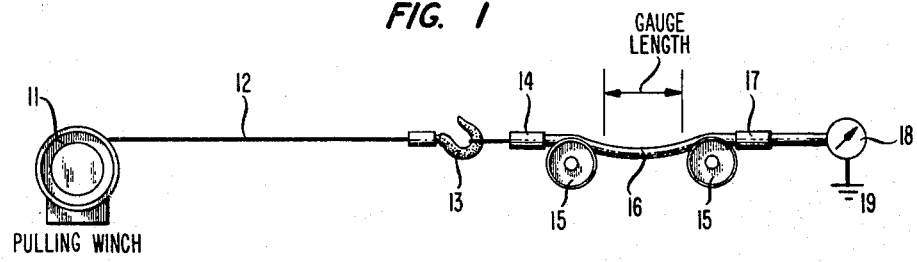
FIG. 1 shows an experimental setup suitable for determining the parameters used to calculate the helical lay angle.

A test setup suitable for determining these values is shown in FIG. 1. The source of stress can be a ratchet pulling winch 11 connected to the cable core through a one-fourth inch stranded steel rope 12. A hook 13 is attached to the rope by a swivel connection, and attached to the cable core under test 16 by a grip 14. The cable core under test is attached to a load measuring device 18 through a grip 17. A suitable load measuring device is the Data Instruments Inc., Tyco Model JP-2000 load cell, which is in turn attached to a stationary object 19. Starting from a zero (or given) stress condition, the change in the length of the cable core under test over a given gauge length due to an applied stress is determined. The gauge length is measured to provide the length of the cable core as suspended, including any sag in the cable core. The gauge length provides the value of $L_c$, while the change in length is the value of $\Delta L_c$. The diameter of the cable core under test is also measured; for example, by an Instron transverse strain sensor, Model G-57-11. The diameter is first determined under the same stress conditions at which the gauge length is measured, and then again at the same applied stress at which $\Delta L_c$ is measured. The value of $R_c$ is then one-half the initial diameter, and $\Delta R_c$ is one-half the change in the diameter under the aforesaid applied stress.

To provide for improved accuracy and consistency in the determination of N, the above data is preferably measured over a series of stress increments, and the resulting values of N averaged. A still more desirable method in many cases is to fit the data resulting from successive stress increments to a regression formula; a least-squares fit method can be used. If zero strain is assumed at some small prestress, the formula (5) can be used, where $\epsilon_r$ is the radial strain of the core, $\epsilon_L$ is the axial strain of the core, and K is a constant.

$$\epsilon_r = -N\epsilon_L + K \qquad (5)$$

In this formula, each set of data points $(\Delta R_c/R_c)$, $(\Delta L_c/L_c)$ is plotted or otherwise recorded on a graph having $\epsilon_r$ and $\epsilon_L$ as the coordinate axes. The values of N and K are then chosen to result in a line having a minimum (least-squares) deviation from the data. A numerical calculation can alternatively be used to obtain N and K from the data points, according to known methods.

This technique has been successfully applied to a lightguide cable. It is important in lightguide cables to reduce the tendency of the cable to kink during handling. This is facilitated when an armoring layer on the cable obtains a zero torque response. As an illustrative example of the present technique, a lightguide cable comprising optical fibers, as otherwise described in U.S. Pat. No. 4,241,979, coassigned with the present application, is measured to determine the appropriate lay angle of a helical armoring layer.

EXAMPLE

Figure 2:
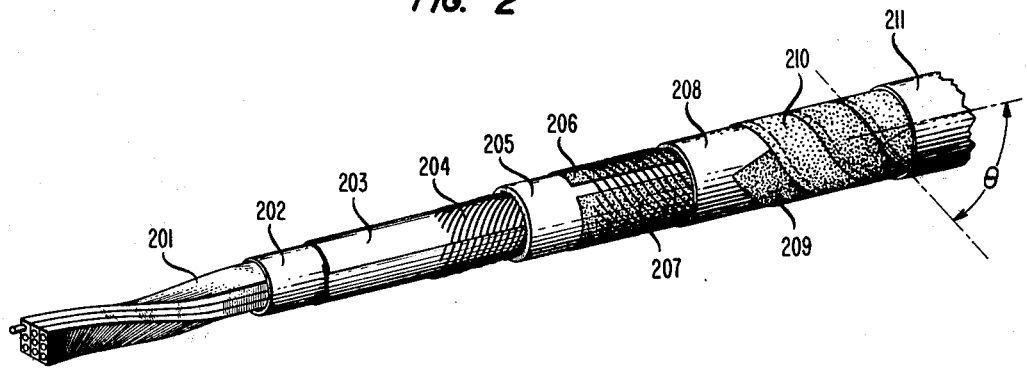
FIG. 2 shows an optical fiber cable having a helical armor layer according to the inventive method.

A lightguide cable, as substantially shown in FIG. 2, is constructed according to the following description. The core of the cable refers to all portions of the cable inside the helical armor layer (209, 210). At the center of the core is a space for lightguides, which may be packaged in the form of ribbons. Typically, each ribbon (201) comprises 12 optical fibers, with fewer shown for clarity. The ribbons may be twisted, with one twist per 46 cm for the cable shown. An unsintered polytetrafluoroethylene (PTFE) tape (not shown) is applied over the ribbons to act as a thermal barrier. The PTFE tape is about 21 mm wide by 0.08 mm thick and is applied longitudinally with an overlapped seam. A polyethylene tube 202 extruded over the PTFE tape acts as a protective chamber for the ribbon structure. The tube material is a high-density polyethylene formed in a continuous extrusion, having an inside diameter of 6.35 mm and a thickness of 0.71 mm. A spunbonded polyester tape 203 is applied over the polyethylene tube. The tape is 2.54 cm wide by 0.2 mm thick. It is applied longitudinally with an overlapped seam. The next layer comprises fourteen stainless steel wires 204, each having a diameter of 0.43 mm and being of type 302 stainless steel. The wires are applied so as to complete one turn in a longitudinal distance of 25.4 cm. The next layer is a jacket of polyethylene 205 applied over the steel wires. The jacket is a continuous extrusion of high-density polyethylene having a wall thickness of 0.69 mm, with the outside diameter being 9.78 mm. A spunbonded polyester tape 206 is then applied, with the tape being 2.54 cm wide by 0.2 mm thick. The tape is applied in a longitudinal manner, resulting in a gap of approximately 5.6 mm. Fourteen stainless steel wires 207 comprise the next layer and are wound with a lay in the opposite direction as the preceding wires, completing one turn in 38.4 cm. The wires are type 302 stainless steel, having a diameter of 0.43 mm. A jacket of polyethylene 208 forms the next layer, wherein the steel wires are incorporated into the wall thickness of the polyethylene. The thickness of this jacket is 1.02 mm, with an outside diameter of 12.2 mm. This cable core has substantially zero torque response.

This cable core was tested in the experimental setup shown in FIg. 1 to determine the value of N. A length of the cable core sufficient to provide a gauge length of approximately 297 cm (117 inches) was suspended across rollers 15, as shown. The diameter of the cable was measured at approximately the midpoint, with an Instron transverse strain sensor. A stress was then applied to the cable using the winch to result in an elongation of the cable ($\Delta L_c$) of 0.79 mm (1/32 inch). The transverse strain sensor was again used to measure the diameter to determine the value of $\Delta R_c$. The axial stress applied by the winch was increased to produce an additional elongation of 0.79 mm (1/32 inch), and the measurements repeated. This procedure was accomplished for 24 incremental stress values, producing a total elongation of 1.91 cm (¾ inch). For each increment, the values of ($\Delta L_c/L_c$) and ($\Delta R_c/R_c$) were determined. When the complete set of data points was obtained, the values of N and K were determined by a "least squares fit" method for equation (5). Three separate series of elongations, each starting from approximately zero stress, were accomplished. The average value of N was thereby determined to be 0.42. The value of the lay angle $\theta$ was thereby calculated from equation (4) and determined to be approximately 57 degrees. For the above cable core, this results in 12 turns per foot (0.30 meter) for the helical armor layer on the core. A suitable armor layer comprises two helical steel wraps applied at a lay angle of 57 degrees. Each wrap has the following characteristics: 16.3 mm width, 0.127 mm thickness, overlapped 5.59 mm on each side. These wraps can be applied in two partially overlapped portions 209, 210, as shown in FIG. 2, in order to ensure no gaps occur during flexing of the cable. However, they are still considered to be a single helical element for the purposes of the present invention because they have the same lay angle, the same "sense" of the lay (i.e., both have right-hand lay or left-hand lay), and substantially the same distance from the center of the core. Rather than alternating the overlapped edges as shown in FIG. 2, one of the wraps can be applied so as to cover the other wrap at both edges. Additional wraps can be similarly provided and still be considered a single helical element. Finally, a jacket of high-density polyethylene 211 can be extruded over the helical armor layer. The resulting cable has a substantially zero torque response.

To determine the torque response of a cable, a simple approximation is to measure the unrestrained twist of the cable when stressed. A cable can be hung vertically and stressed by means of a weight. For the purpose of the present invention, a cable is considered to have substantially zero torque response when the cable twists less than 3 turns for a 100 meter (328 foot) vertically suspended length when a 1 percent axial strain is applied. This criterion can be scaled for other lengths and other twists accordingly; e.g., a twist of less than 0.3 turns for a 10 meter length when a 1 percent axial strain is applied. An alternative measuring method which yields substantially similar information is to measure the torque of the cable when tensioned in a twist restrained condition and divide it by the torsional stiffness of the cable. For example, the experimental setup of FIG. 1 can be utilized, with a torque-measuring device inserted in place of the load cell. A suitable torque transducer, manufactured by the Vibrac Corporation, is the Model TQ1600 static transducer. For a given strain, the torque in newtonmeters is determined. Next, the torsional stiffness of the same length of cable is determined according to techniques known in the art. The strain rate of torque divided by the torsional stiffness yields a figure of merit having the units turns per meter per unit of strain. By this measurement procedure, a cable having a figure of merit of less than 3 turns per meter per unit of strain is considered to have a substantially zero torque response for the purpose of the present invention. In some cases, a value of less than 1 turn per meter per unit of strain can be achieved in commercial practice using the present technique.

In modern cable manufacturing operations, it is typically possible to obtain a helical lay angle within $\pm 1$ degree of the design value. In the cable of the above Example, this corresponds to $\pm\frac{1}{2}$ turn per foot (0.30 meter) difference from the design value of 12 turns per foot (0.30 meter).

Having thus determined that a substantially torque-free single helical layer can be applied, it can be seen that other techniques can be used to find the proper lay angle. The most straightforward technique is to simply vary the lay angle, by providing more or less turns per foot of the helical element to a core, and test the cable torque response. In this manner, a substantially zero torque response helical layer can be obtained. Normally, the core on which the torque-free helical layer is applied also has substantially zero torque response. Thus, the resulting cable has substantially zero torque response. However, it is possible to apply a zero torque response helical layer according to the present technique to cores that do not have a substantially zero torque response. The resulting cable, if twist restrained, will then have a torque response that is substantially the same as the core prior to applying the helical element. The value of N in equation (4) can also be determined by other techniques than the test method described. For example, if the core is a substantially isotropic incompressible material, the value of N can be theoretically calculated, being 0.5. With non-isotropic core material, the above experimental method is advantageously used to evaluate N, especially when N differs from the above theoretical value by greater than 10 percent; i.e., when N is less than 0.45 or greater than 0.55. Helical layers other than armor layers can also advantageously be applied. For example, tape layers or stranded layers can be applied. All such variations and deviations through which the present invention has advanced the art are considered to be within the spirit and scope of the present invention.

What is claimed is:

1. A cable comprising a substantially cylindrical core, the core having a torque response when a length of the core is stressed in axial tension, the cable further comprising a helical element surrounding the core substantially contactingly, with substantially constant lay angle, the lay angle being substantially equal to an angle $\theta$ characterized in that the angle $\theta$ is chosen in accordance with the formula $$\theta = \tan^{-1}[N^{-\frac{1}{2}}],$$

where $$N = \frac{-\Delta R_c/R_c}{\Delta L_c/L_c},$$

with $R_c$ the radius of the core, $L_c$ the length of a segment of the core, $\Delta L_c$ the change in the length of the segment upon application of a first axial stress to the core, and $\Delta R_c$ the change in the core radius upon application of the first axial stress, whereby the torque response of the helical-element-surrounded core is caused to be substantially the same as the torque response of the core.

2. Cable of claim 1, wherein the lay angle is within about $\pm 1°$ of the angle $\theta$.

3. Cable of claim 1, wherein the difference in torque response between the helical-element-surrounded core and the core produces at most a 3-turn twist difference between a 100 meter long segment of core stretched by 1% and a 100 meter long segment of the helical-element-surrounded core stretched by 1%.

4. Cable of claim 1, wherein the torque-response of the core is substantially zero.

5. Cable of claim 1, wherein the core comprises at least one optical fiber.

6. Cable of claim 1, wherein the helical element is a metallic armor element.

7. Cable of claim 1, wherein $\theta$ is determined by a procedure comprising
 (a) determining the length $L_c$ of a segment of core and the core radius $R_c$,
 (b) applying an axial stress to the segment of core, and
 (c) determining the resulting change in the length of the segment $\Delta L_c$ and in the core radius $\Delta R_c$.

8. Cable of claim 7, wherein $\Delta L_c$ and $\Delta R_c$ are determined for a multiplicity of applied stresses, and a least-squares fit of the resulting values is used to obtain the value of N.

9. Cable of claim 1, wherein N is greater than 0.55 or less than 0.45.

* * * * *